United States Patent
Flade

(10) Patent No.: US 11,629,782 B2
(45) Date of Patent: Apr. 18, 2023

(54) PISTON RING ARRANGEMENT

(71) Applicant: STASSKOL GMBH, Stassfurt (DE)

(72) Inventor: Georg Flade, Halle (DE)

(73) Assignee: STASSKOL GMBH, Stassfurt (DE)

( * ) Notice: Subject to any disclaimer, the term of this patent is extended or adjusted under 35 U.S.C. 154(b) by 0 days.

(21) Appl. No.: 17/339,193

(22) Filed: Jun. 4, 2021

(65) Prior Publication Data

US 2021/0381598 A1 Dec. 9, 2021

(30) Foreign Application Priority Data

Jun. 5, 2020 (DE) .......................... 102020114944.1

(51) Int. Cl.
*F16J 9/12* (2006.01)
*F04B 53/14* (2006.01)

(52) U.S. Cl.
CPC .............. *F16J 9/12* (2013.01); *F04B 53/143* (2013.01)

(58) Field of Classification Search
CPC . F16J 9/12; F16J 9/20; F16J 9/16; F16J 9/26; F16J 9/28; F16J 9/02; F04B 53/143; F02F 5/00
See application file for complete search history.

(56) References Cited

U.S. PATENT DOCUMENTS

| | | | | |
|---|---|---|---|---|
| 3,893,675 A * | 7/1975 | Geffroy | ...................... | F16J 9/20 277/491 |
| 4,185,842 A * | 1/1980 | Magara | .................. | F02G 1/0535 277/944 |
| 4,555,118 A * | 11/1985 | Saliger | .................... | F16L 39/06 285/275 |
| 6,457,722 B1 * | 10/2002 | Feistel | ..................... | F16J 15/26 277/546 |
| 7,735,834 B2 * | 6/2010 | Hofbauer | ................. | F16J 9/063 123/65 R |
| 2003/0006562 A1 * | 1/2003 | Feistel | ....................... | F16J 9/28 277/434 |
| 2005/0051970 A1 * | 3/2005 | Edelmann | .................. | F16J 9/16 277/435 |
| 2012/0304854 A1 * | 12/2012 | Hold | ..................... | F16J 15/166 92/172 |
| 2014/0015202 A1 * | 1/2014 | Chacko | ................. | F04B 1/0448 277/500 |

(Continued)

FOREIGN PATENT DOCUMENTS

CH 482953 A 12/1969
DE 3148488 A1 6/1983

(Continued)

*Primary Examiner* — Grant Moubry
(74) *Attorney, Agent, or Firm* — Hudak, Shunk & Farine Co. LPA

(57) ABSTRACT

Piston ring arrangement (40) with a piston ring (50) encircling a main axis (X), the piston ring (50) having a sealing surface (58) directed radially outward and a contact surface (55) directed radially outward, the sealing surface (58) being radially outside of the contact surface (55). To improve the service life of piston rings for reciprocating compressors, the piston ring arrangement (40) has a retaining ring (70) encircling the main axis (X) with a retaining surface (72) directed radially inward, the piston ring (50) and the retaining ring (70) being situated such that the retaining surface (72) and the contact surface (55) are adjacent in the radial direction.

21 Claims, 4 Drawing Sheets

(56) References Cited

U.S. PATENT DOCUMENTS

| | | | | |
|---|---|---|---|---|
| 2014/0090554 A1* | 4/2014 | Chalk | ............... | F16J 15/34 |
| | | | | 92/172 |
| 2014/0298984 A1* | 10/2014 | Hofbauer | ............... | F16J 9/16 |
| | | | | 92/169.1 |
| 2017/0299058 A1* | 10/2017 | Jordan | ............... | F16J 15/3236 |
| 2019/0049009 A1* | 2/2019 | Svrcek | ............... | F16J 9/16 |
| 2021/0381598 A1* | 12/2021 | Flade | ............... | F04B 53/143 |

FOREIGN PATENT DOCUMENTS

| | | |
|---|---|---|
| EP | 1515070 A1 | 3/2005 |
| WO | 9719280 A1 | 5/1997 |

* cited by examiner

PISTON RING ARRANGEMENT

FIELD OF THE INVENTION

The present invention relates to a piston ring arrangement and a piston and to a reciprocating compressor and its application.

BACKGROUND OF THE INVENTION

Reciprocating compressors are used to compress process gases in a compression chamber. With reciprocating compressors, as opposed to internal combustion engines, there is no direct combustion of the compressed process gas in the compression chamber. Reciprocating compressors are widely used in industrial processes, such as the compression of natural gas (Compressed Natural Gas, CNG).

To compress the process gas, reciprocating compressors have a piston that performs an oscillating, axial movement in a liner. Piston and liner do not touch, since at least one of these components would be damaged if they touched. In the axial direction, the area around the piston can be divided into a high-pressure side, where the process gas is compressed, and a low-pressure side. Because of the pressure increase, the process gas tends to escape along the piston from the high-pressure side to the low-pressure side. This occurrence is known as "leakage."

Reciprocating compressor manufacturers are constantly aiming to reduce leakage. Internal leakage is a concern in the gas processing sector, in which the machines are usually designed with a crosshead. This means that the process gas does not escape into the atmosphere. However, leakage leads to higher energy consumption requirements for compression and thus higher operating costs. In addition, the achievable flow rate of a compressor stage is reduced.

To reduce the leakage, it is known from the prior art to place one or more piston rings around the piston. The piston rings seal the gap between the liner and piston, thus limiting the volume flow of the process gas. Since the piston rings come into contact with the liner and move relative to the liner, they are usually made of materials with a low coefficient of friction, such as PEEK or PTFE compounds.

Various piston ring arrangements are already established by WO 97/19280 A1, EP 1 515 070 A1, DE 31 48 488 A1, and CH 482 953 A. DE 31 48 488 A1 and CH 482 953 A both show an assembled piston with several piston discs placed axially one behind the next, thereby forming grooves, in each of which a piston ring is situated.

One problem with piston rings making contact at high differential pressures can be, depending on the application, the generation of high frictional heat. Examples include CO compressors because of the risk of gas decomposition or $O_2$ compressors because of the oxidizing effect of the gas.

Because they are in contact with the liner, the piston rings are also subject to wear. The wear depends, among other things, on the pressure to which the process gas is compressed. Unlubricated applications are fundamentally more demanding than lubricated applications in terms of wear. It is also known that wear also depends on the type of process gas and its moisture content or its percentage of wear-inducing constituents, such as abrasive particles.

If the piston rings are worn, they must be replaced. This replacement is associated with a shutdown of the reciprocating compressor. The service lives of known piston rings are unsatisfactory, particularly with very high pressure differentials of over 150 bar in dry operation and with gases that are very wear-inducing (for example, $H_2S$).

SUMMARY OF THE INVENTION

It is therefore the object of the invention to improve the service life of piston rings for reciprocating compressors.

The object is achieved by a piston ring arrangement with a piston ring encircling a main axis (X), the piston ring having a sealing surface directed radially outward and a contact surface directed radially outward, the sealing surface being radially outside of the contact surface, characterized by a retaining ring encircling the main axis (X) with a retaining surface directed radially inward, the piston ring and the retaining ring being arranged such that the retaining surface and the contact surface are adjacent in the radial direction.

The piston ring arrangement comprises a piston ring encircling a main axis X, the piston ring having a sealing surface directed radially outward and a contact surface directed radially outward. The sealing surface is located radially outside of the contact surface. The piston ring arrangement also has a retaining ring that encircles the main axis X and has a retaining surface directed radially inward. The piston ring and the retaining ring are arranged such that the retaining surface and the contact surface are adjacent in the radial direction. In other words, the retaining surface and the contact surface overlap in the axial direction.

The retaining ring is thus located radially outside of the piston ring in the area of the contact surface. The dimensioning of the retaining ring thus determines the maximum wear on the piston ring. This is particularly true when the piston ring is pretensioned inward in the radial direction. The piston ring attempts to bend open to assume its relaxed state. Because of the retaining ring, however, the piston ring cannot bend outward as far as desired in the radial direction despite its internal stress. The maximum wear is thus limited. This assembly also limits the frictional heat generated between the piston ring and the liner.

The contact surface can be cylindrical or at an angle $\alpha \leq 45°$ oblique to the main axis X. The retaining surface can be cylindrical or at an angle $\beta \leq 45'$ oblique to the main axis X. It is particularly preferred that $\alpha = \beta$. At angles $\alpha, \beta \leq 45°$, the piston ring is securely held by the retaining ring and does not tend to slip. The angles are particularly preferably even smaller than 20°. In other words, $\alpha, \beta \leq 20°$.

As mentioned, the retaining surface and the contact surface are adjacent. "Adjacent" comprises both an arrangement in which the surfaces are spaced apart and an arrangement in which surfaces fit together at least partially. When new, the surfaces are preferably spaced apart, thereby forming a first gap. With normal use, this gap becomes smaller until it disappears completely due to the wear of the piston ring. The piston ring is then worn in and does not wear any further.

The piston ring preferably has a gap in its circumference. In this way, the sealing surface of the piston ring can be readjusted in the radial direction when initial wear occurs. In addition, the gap allows the piston ring to be pretensioned.

In advantageous developments, the piston ring is one piece. In the case of rigid sealing materials such as PEEK compounds, this enables more efficient pretensioning of the ring, which further improves the hold of the piston ring on the retaining ring. In addition, the one-piece construction enables more cost-effective production, minimizes the leakage paths, and improves the stability of the piston ring.

In contrast to the piston ring, the retaining ring should be as stiff as possible in the outward radial direction. The retaining ring is therefore preferably closed in its circumference. In this way, the retaining ring is more stable, and the piston ring is held securely. The retaining ring is also preferably one piece. This also promotes the stability of the retaining ring.

The retaining ring preferably has at least one radially extending channel. Radial channels allow the escaping process gas to pass through to an area radially inside the piston ring. The higher gas pressure of the process gas also pushes the piston ring radially outward, which in turn improves the seal.

As mentioned above, the retaining ring holds the piston ring and limits the extent to which it can bend open. The piston ring therefore preferably consists of a first material with a modulus of elasticity E1, and the retaining ring consists of a second material with a modulus of elasticity E2, where E2>E1. The piston ring is therefore more elastic than the retaining ring due to its material. The piston ring has elasticity if it has a gap, as described above.

The first material is preferably polytetrafluoroethylene (PTFE), a PTFE compound, or a PTFE-based composite material. The second material is preferably polyetheretherketone (PEEK), a PEEK compound, a PEEK-based composite material, or a metal, in particular a bearing metal. PTFE is a material with a low coefficient of friction. Additionally, it is sufficiently flexible to ensure after a possible initial wear that the contact surface and the retaining surface are in circumferential contact after the initial gap has been closed.

The object of the invention is also achieved with a piston with a core extending along a main axis X, around which at least two annular piston discs are located, the piston discs forming at least one groove open radially outward and encircling the main axis X, in which groove a piston ring arrangement per the above description is situated. The piston ring and the retaining ring are held by the piston discs in such a way that the retaining surface and the contact surface are adjacent in the radial direction.

The piston ring arrangement can be movable overall in the radial direction relative to the piston discs. The piston ring wears just enough until the retaining surface and the contact surface lie against one another. Any minor wear that then occurs causes very little leakage, which is accepted in order to improve the service life.

The piston is a multi-piece piston. During its construction, the piston discs are pushed one after another onto a core in the axial direction. The piston discs are then fixed such that they cannot move relative to the core. A piston ring arrangement is set in each groove during the construction of the piston. The piston discs and the piston ring arrangements are thus alternately placed on the core. In this way, the installation of the piston ring arrangements is particularly simple, since the retaining ring does not have to be expanded radially in any way.

The piston discs preferably have an L-shaped cross section. As a result, two axially adjacent piston discs automatically form a groove in which the piston ring arrangement is held securely. The groove preferably has a rectangular cross section, which also ensures a secure hold of the piston ring arrangement.

In normal use, the piston ring arrangement, in particular the piston ring, rests in the axial direction on the side of the groove farther from the high-pressure side due to the pressure from the high-pressure side. A second gap is preferably formed between the side of the groove that is closer to the high-pressure side and the piston ring arrangement, in particular the retaining ring. The gas under high pressure can flow through this gap into the space between the inner diameter of the piston ring and the groove base and press the piston ring against the liner or against the retaining ring. Particularly in the case of a non-cylindrical design of the contact and retaining surfaces, the retaining ring migrates toward the high-pressure side with increasing wear. This creates an axial tension in the piston ring and the retaining ring. This tension fixes the arrangement even with changing pressures and prevents, for example, damage to the grooves due to impact.

Since the retaining ring rests against the side of the groove closer to the high-pressure side, especially when the contact surface and retaining surface are not cylindrical, the retaining ring provides at least one radial groove to improve the gas flow in the direction of the groove base.

The object of the invention is also achieved by a reciprocating compressor with a liner that extends along a main axis X, in which a piston that is movable along the main axis X as described above is located. When new, the sealing surface of the piston ring rests against the inside of the liner, and it gradually wears until the wear is stopped by the retaining ring.

The reciprocating compressor can be a single-acting or a double-acting reciprocating compressor.

In a single-acting reciprocating compressor, the piston ring arrangement is preferably arranged in the groove of the piston disc in such a way that the sealing section of the piston ring is toward the low-pressure side. The retaining ring is then toward the high-pressure side. In normal operation, the retaining ring is thereby pressed against the side of the groove that is closer to the low-pressure side.

With a double-acting reciprocating compressor, the position of the high-pressure and low-pressure side changes depending on the working direction of the piston. In a double-acting reciprocating compressor, the piston thus serves as a seal in both directions. In a double-acting reciprocating compressor, it is therefore advantageous to use a piston with several piston ring arrangements according to the invention, the sealing sections of the piston rings of one part of the piston ring arrangements facing one side of the reciprocating compressor, and the sealing sections of the piston rings of the other part of the piston ring arrangements facing the other, opposite side of the reciprocating compressor, such as shown in FIG. 3. The two sides of the reciprocating compressor alternate as the low-pressure and high-pressure side. As a result of the described arrangement of the piston ring arrangement, there is always at least one piston ring arrangement that seals the piston according to the invention.

In particular, it is advantageous if the piston ring arrangements of such a piston are divided into two, preferably equally large, groups, the groups being arranged one behind the other along the main axis X. The piston ring arrangements within a group have the same orientation. Each group is then responsible for sealing in one of the two possible axial directions of movement of the piston. The two groups are preferably adjacent to the side of the piston that is on the high-pressure side when the respective group is responsible for sealing.

The main axis X can run horizontally (i.e. perpendicular to the direction of gravity), vertically, or at an angle. A reciprocating compressor with a horizontal main axis X is also referred to as a "horizontal compressor." Reciprocating compressors with inclined main axes are referred to as V or W-shaped compressors based on their design.

When used in a horizontal compressor, a V-shaped compressor, or a W-shaped compressor, the piston ring arrangement according to the invention has particular advantages. The piston is preferably connected to a drive system of the reciprocating compressor via a piston rod. The piston rod and/or the piston are supported at several bearing points in compressors. With the types mentioned (basically, with a non-vertical main axis X), these bearing points wear out more at the bottom than at the top overtime due to gravity. Overall, this will lower the piston over time. The piston ring arrangement is independent of the lowering height, since it can move in the radial direction with respect to the main axis X.

The reciprocating compressor is particularly suitable for compressing carbon monoxide (CO), oxygen ($O_2$), or hydrogen sulfide ($H_2S$). In addition, the reciprocating compressor is particularly suitable for compressing gases to pressures above 150 bar, particularly with dry operation (i.e. with unlubricated compressors).

BRIEF DESCRIPTION OF THE DRAWINGS

Following, the invention is illustrated and explained by way of example with reference to the drawings. Depicted are.

DETAILED DESCRIPTION OF THE INVENTION

Figure 1:
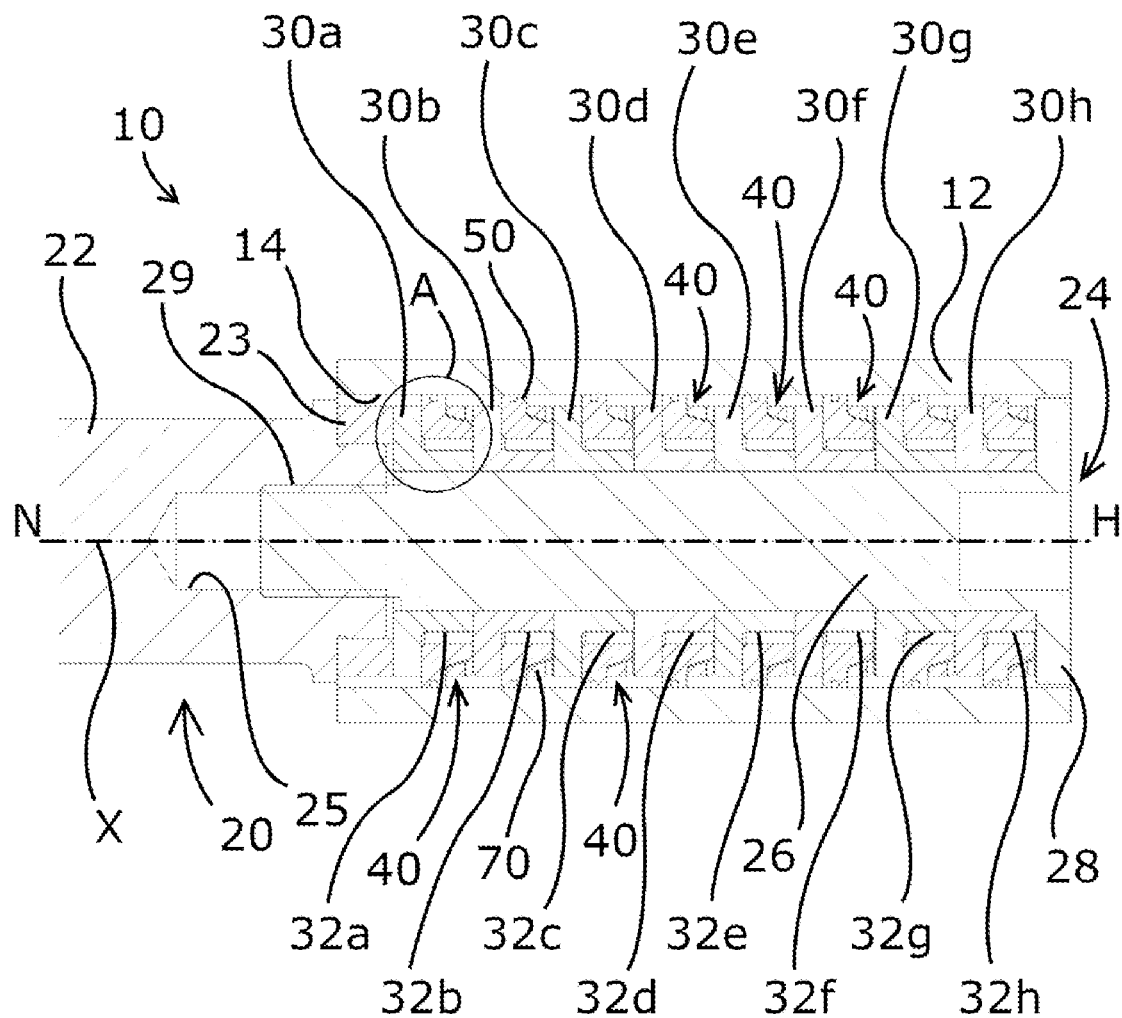
FIG. 1 a cross-sectional view of a reciprocating compressor according to the invention.

FIG. 1 shows a section of a reciprocating compressor 10 according to the invention with a cylindrical liner 12 and a piston 20. The liner 12 and the piston 20 extend along a main axis X. The main axis X is horizontal in normal operation, thus the reciprocating compressor 10 is a horizontal reciprocating compressor.

The liner 12 has an inside 14 that forms the sliding surface for a piston ring arrangement 40 of the piston 20. A compression chamber of the reciprocating compressor 10 in which gases are compressed is not shown. The compression chamber lies on a high-pressure side H with respect to the piston 20. In normal operation, the piston 20 oscillates along the main axis X.

The piston 20 has a holder 22 as well as a core 24 and several piston discs 30a-30h. The holder 22 has a bore with an internal thread 25. The core 24 has a cylinder section 26 and a flange 28 mounted on the end of the cylinder section 26. At the opposite end, the cylinder section 26 has an external thread 29.

The piston discs 30a-30h are identical and each encircle the main axis X. They are ring-shaped and have an L-shaped cross section.

The piston 20 is multi-piece piston. During its construction, the piston discs 30a-30h are pushed one after another onto the core 24 in the axial direction, whereby multiple circumferential grooves 32a-32h are formed by adjacent piston discs 30a-30h, or a piston disc 30h with the flange 28.

A piston ring arrangement 40 is situated in each groove during the construction of the piston 20. In the embodiment depicted in FIG. 1, a total of eight identical piston ring arrangements 40 are provided. The piston ring arrangements 40 do not have to be expanded in the radial direction during assembly due to the L-shape of the piston discs 30a-30h. Rather, they can be pushed onto the core 24 alternately with the piston discs 30a-30h in the axial direction.

When ail piston discs 30a-30h as well as all piston ring arrangements 40 have been pushed onto the core 24, the holder 22 with the internal thread 26 is screwed onto the external thread 29 of the core 24, with a locking ring 23 first situated between the holder 22 and the adjacent piston disc 30a. In this way, the piston discs 30a-30h are clamped in the axial direction between the clamping ring 23 and the flange 28 and are thus held securely.

Because of the pressure increase, the gas to be compressed tends to escape from the high-pressure side H along the piston 20 to a low-pressure side N. This occurrence is known as "leakage." The piston ring arrangements 40 serve to limit the leakage.

Figure 1A:
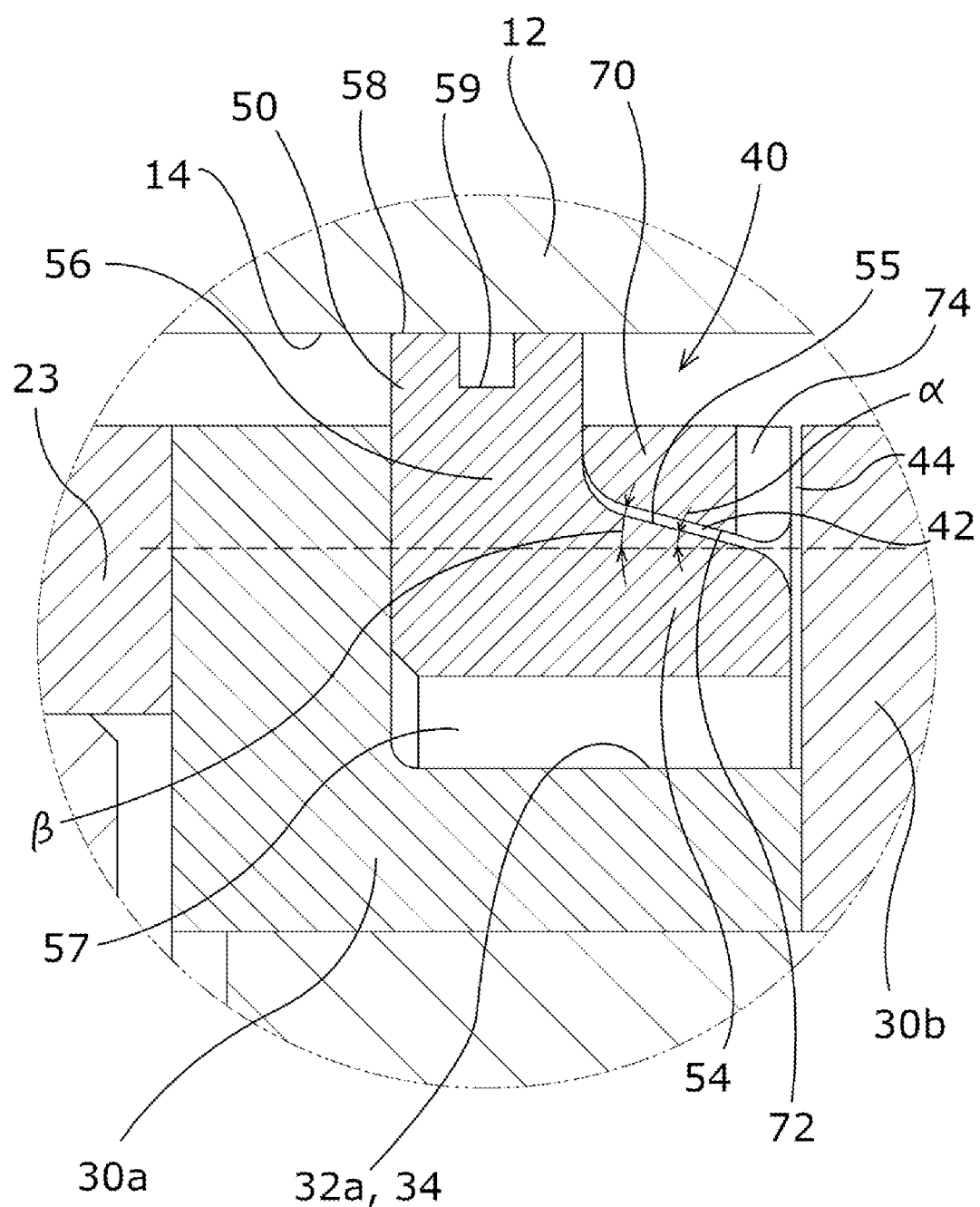
FIG. 1a the detail view A of FIG. 1.

Each piston ring arrangement 40 has a piston ring 50 and a retaining ring 70. Both rings 50 and 70 encircle the main axis X. The piston ring 50 has a basic L-shape in cross section with an axially extending retaining section 54 and a sealing section 56 protruding radially outward from the retaining section 54 (see FIG. 1a). The sealing section 56 forms a sealing surface 58 directed radially outward which, in normal use, rests against the inside 14 of the liner 12.

The sealing surface 58 is interrupted by a groove 59 along the circumference of the piston ring 50. The groove 59 causes swirling of the process gas, which counteracts the leakage.

Figure 2:
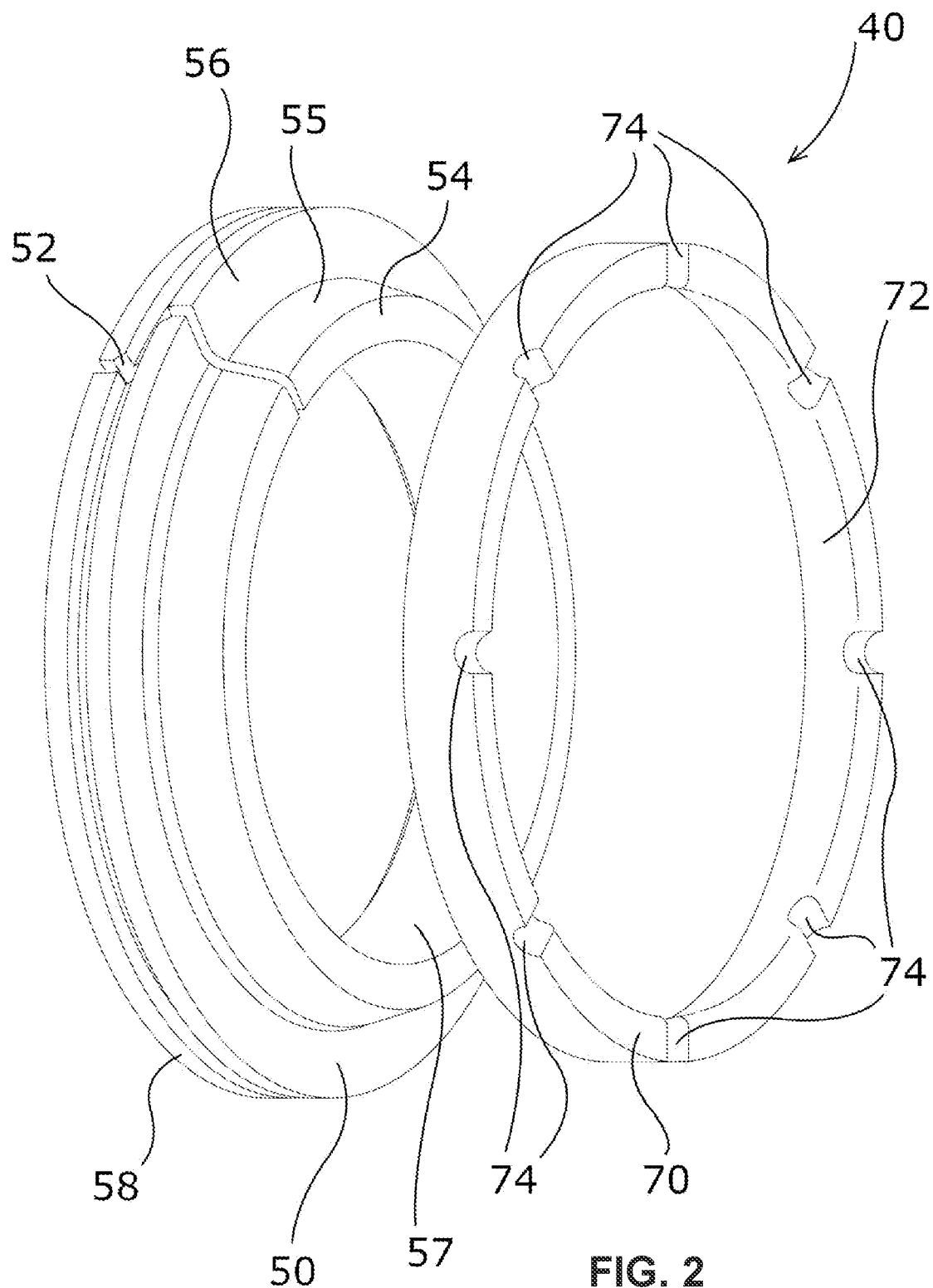
FIG. 2 a piston ring arrangement according to the invention in an exploded view.
Figure 3:
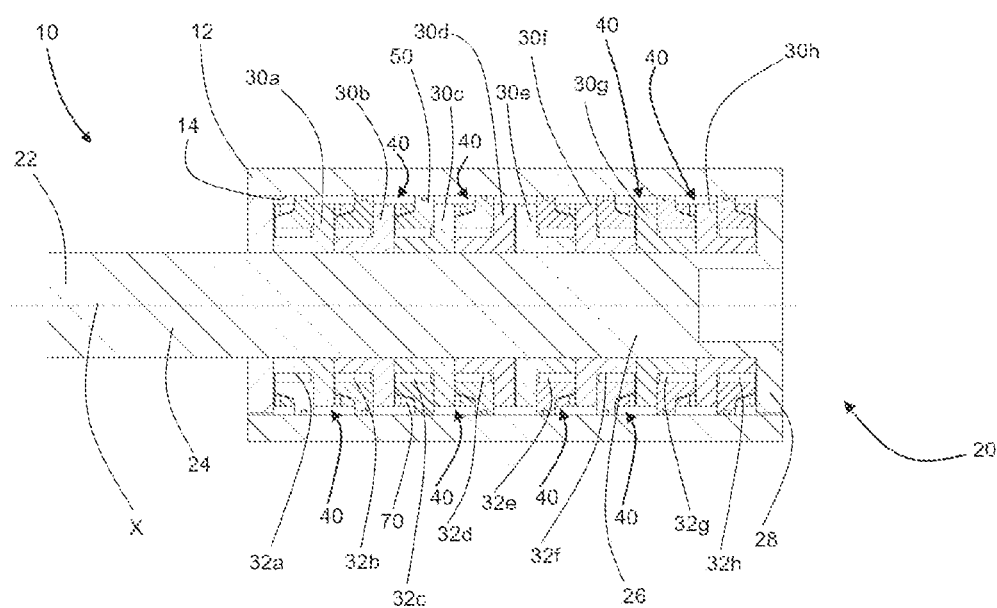
FIG. 3 a cross-sectional view of a further embodiment of a reciprocating compressor according to the invention.

The piston ring 50 is not closed circumferentially, but rather has a gap 52 (see FIG. 2). This makes it possible for the piston ring 50 to be closed or splayed open in the radial direction. The gap 52 runs completely through the sealing section 56 in the axial direction, but has a step that presents an obstacle for the escaping process gas and reduces leakage.

The piston ring 50 is oversized, so its outer diameter on the sealing surface 58 is greater than the inner diameter of the liner 12 in the relaxed state. Because of the gap 52, the piston ring 50 is compressed in the radial direction when the piston 20 is inserted into the liner 12, whereby the gap 52 becomes smaller and the piston ring 50 is pretensioned in the radial direction.

The piston ring 50 also has a contact surface 55, which is formed by the retaining section 54. The contact surface 55 is also directed radially outward and has the shape of the lateral surface of a conical segment. The contact surface 55 runs at an angle α oblique to the main axis X and thus to the horizontal. In the embodiment shown, the angle α is approximately 15°.

In embodiments other than that shown, the contact surface 55 has the shape of the lateral surface of a cylinder. The contact surface 55 then does not run at an angle, but rather parallel to the main axis X.

The piston ring 50 further includes an inner surface 57 directed radially inward. The inner surface 57 does not contact the respective groove base 34 of the grooves 32a-32h. The piston ring 50 thus has an inner diameter greater than the outer diameter of the piston discs 30a-30h in the area of the groove bases 34.

The wear of the piston ring 50 is limited by the retaining ring 70. The retaining ring 70 has no gap, but rather is closed circumferentially.

The retaining ring 70 has a retaining surface 72 directed radially inward, which also has the shape of the lateral surface of a conical segment. The retaining surface runs at an angle β oblique to the main axis X and thus to the horizontal. In the embodiment shown, the angle β is approximately 15°. By the degree of the angles α, β, the retaining surface 72 and the contact surface 55 thus run essentially parallel.

In embodiments other than that shown, the retaining surface 72 has the shape of the lateral surface of a cylinder. The retaining surface 72 then does not run at an angle, but rather parallel to the main axis X.

The piston ring 50 and the retaining ring 70 are held by the piston discs 30a-30h in such a way that the retaining surface 72 and the contact surface 55 are adjacent in the radial direction. However, this does not preclude the rings 50 and 70 from having axial play, in other words, from being able to move slightly axially.

The piston ring 50 is pretensioned inward in the radial direction. When new (see FIG. 1a), the sealing section 56 keeps the retaining section 54 at a distance from the inside 14 far enough that the retaining surface 72 and the contact surface 55 do not lie against one another. The contact surface 55 and the retaining surface 72 thus form a first gap 42. During operation, the pressure of the process gas presses the piston ring 50 in the direction of the low-pressure side N against the adjacent piston disc 30a-30h. A second gap 44 is formed between the retaining ring 70 and the piston disc 30a-30h adjacent to it in the direction of the high-pressure side H.

During operation, the piston ring 50 gradually wears in the area of the sealing section 56. Due to the pretensioning of the piston ring 50, however, the sealing surface 58 still rests on the inside 14 even after a certain amount of wear. This process is fundamentally desired, since the sealing surface 58 optimally conforms itself to the inside. If a certain amount of wear is reached, the contact surface 55 rests against the retaining surface 72; in other words, the gap 42 has closed. The piston ring 50 then continues to wear slightly until the sealing surface 58 is a small distance from the inside 14 and no longer comes into contact with the inside 14. This means that a certain amount of leakage is accepted. However, the wear on the piston ring 50 is limited, and its service life is thereby extended.

The retaining ring 70 has eight radial grooves 74 evenly distributed in its circumference (FIG. 2). In other embodiments, radial bores can also be provided instead. The radial grooves 74 direct the process gas to the respective groove base 34 of the grooves 32a-32h. As a result, the piston rings 50 are pressed radially outward, thus improving the seal between the respective piston ring 50 and the liner 12.

LIST OF REFERENCE SYMBOLS

10 Reciprocating compressor
12 Liner
14 inside
20 Piston
22 Holder
23 Locking ring
24 Core
25 Internal thread
26 Cylinder section
28 Range
29 External thread
30a-30h Piston disc
32a-32h Groove
34 Groove base
40 Piston ring arrangement
42 First gap
44 Second gap
50 Piston ring
52 Gap
54 Retaining section
55 Contact surface
56 Sealing section
57 Inner surface
58 Sealing surface
59 Groove
70 Retaining ring
72 Retaining surface
74 Radial groove
H High-pressure side
N Low-pressure side
X Main axis
α Angle
β Angle

What is claimed is:

1. A piston ring arrangement, comprising:
a piston ring encircling a main axis (X), the piston ring having a sealing surface directed radially outward and a contact surface directed radially outward, the sealing surface being radially outside of the contact surface,
a retaining ring encircling the main axis (X) with a retaining surface directed radially inward,
the piston ring and the retaining ring being arranged such that the retaining surface and the contact surface are adjacent in the radial direction, and
wherein the retaining ring is a closed, unbroken ring.

2. The piston ring arrangement according to claim 1, wherein the piston ring has a gap in the circumference.

3. The piston ring arrangement according to claim 1, wherein the piston ring is pretensioned inward in the radial direction.

4. The piston ring arrangement according to claim 1, wherein the contact surface runs oblique to the main axis (X) at an angle α≤45°.

5. The piston ring arrangement according to claim 1, wherein the retaining surface runs oblique to the main axis (X) at an angle β≤45°.

6. The piston ring arrangement according to claim 1, wherein the piston ring is one piece.

7. The piston ring arrangement according to claim 1, wherein the retaining ring is one piece.

8. The piston ring arrangement according to claim 1, wherein the retaining ring has at least one radially extending channel.

9. The piston ring arrangement according to claim 1, wherein the piston ring consists of a first material with a modulus of elasticity E1, and the retaining ring consists of a second material with a modulus of elasticity E2, where E2>E1.

10. The piston ring arrangement according to claim 9, wherein the first material is polytetrafluoroethylene (PTFE), a PTFE compound, or a PTFE-based composite material.

11. The piston ring arrangement according to claim 9, wherein the second material is polyetheretherketone (PEEK), a PEEK compound, a PEEK-based composite material, or a metal.

12. A piston, comprising: a core extending along a main axis (X), encircled by at least two annular piston discs, the piston discs forming at least one groove open radially outward and encircling the main axis (X), and wherein a piston ring arrangement according to claim 1 is situated in the groove.

13. The piston according to claim 12, wherein the piston ring arrangement is movable overall in the radial direction relative to the piston discs.

14. The piston according to claim 12, wherein the piston discs have an L-shaped cross section.

15. The piston according to claim 12, wherein the groove has a rectangular cross-section.

16. A reciprocating compressor having a liner extending along a main axis (X) and in which there is a piston that can move along the main axis (X) according to claim 12.

17. The reciprocating compressor according to claim 16, wherein the main axis (X) runs horizontally or obliquely.

18. The reciprocating compressor according to claim 16, wherein the reciprocating compressor is single-acting and the piston ring arrangement is situated in the groove of the piston disc in such a way that the sealing section of the piston ring faces the low-pressure side (N).

19. The reciprocating compressor according to claim 16, wherein the reciprocating compressor is double-acting and comprises a piston with several piston ring arrangements, the sealing sections of the piston rings of a part of the piston ring arrangements facing one side of the reciprocating compressor, and the sealing sections of the piston rings of the other part of the piston ring arrangements facing the other, opposite side of the reciprocating compressor.

20. A method, comprising the steps of:
 obtaining the reciprocating compressor according to claim 16, and compressing carbon monoxide (CO), oxygen ($O_2$) or hydrogen sulfide ($H_2S$) with the reciprocating compressor.

21. A method, comprising the steps of: obtaining the reciprocating compressor according to claim 16, and compressing gases to pressures above 150 bar.

\* \* \* \* \*